United States Patent
Ruiz De Veye et al.

(10) Patent No.: US 8,569,565 B2
(45) Date of Patent: Oct. 29, 2013

(54) PROCESS FOR RECYCLING SPENT POT LININGS (SPL) FROM PRIMARY ALUMINIUM PRODUCTION

(75) Inventors: Carlos Ruiz De Veye, Erandio (ES); Ignacio Alfaro Abreu, Erandio (ES)

(73) Assignee: Befesa Aluminio, S.L., Erandio, Vizcaya (ES)

( * ) Notice: Subject to any disclaimer, the term of this patent is extended or adjusted under 35 U.S.C. 154(b) by 395 days.

(21) Appl. No.: 12/808,658

(22) PCT Filed: Jan. 15, 2009

(86) PCT No.: PCT/EP2009/000189
§ 371 (c)(1),
(2), (4) Date: Oct. 29, 2010

(87) PCT Pub. No.: WO2009/092539
PCT Pub. Date: Jul. 30, 2009

(65) Prior Publication Data
US 2011/0045962 A1    Feb. 24, 2011

(30) Foreign Application Priority Data
Jan. 25, 2008 (EP) .................................. 08380016

(51) Int. Cl.
| | | |
|---|---|---|
| G21F 9/14 | (2006.01) | |
| A62D 3/30 | (2007.01) | |
| B22F 1/00 | (2006.01) | |
| B22F 9/00 | (2006.01) | |
| C21B 15/04 | (2006.01) | |
| C01F 1/00 | (2006.01) | |

(52) U.S. Cl.
USPC ................ 588/18; 588/313; 75/370; 75/371; 423/122; 423/131

(58) Field of Classification Search
USPC ......... 423/111, 122, 119, 126, 131, 132, 489; 75/343, 370, 371; 588/18, 313, 316, 588/317, 319
See application file for complete search history.

(56) References Cited

U.S. PATENT DOCUMENTS

| | | | |
|---|---|---|---|
| 4,822,388 A * | 4/1989 | Gee ................................. | 65/376 |
| 4,889,695 A | 12/1989 | Bush | |
| 5,352,419 A | 10/1994 | Jenkins | |
| 5,470,559 A | 11/1995 | Grolman et al. | |
| 5,939,035 A * | 8/1999 | Besida et al. ................. | 423/131 |
| 6,132,574 A | 10/2000 | Feige et al. | |
| 6,596,252 B2 * | 7/2003 | Kasireddy et al. ............ | 423/489 |
| 6,696,617 B1 | 2/2004 | Cashman | |
| 6,770,249 B1 * | 8/2004 | Hoboy et al. .................... | 423/38 |
| 2003/0069462 A1 * | 4/2003 | Fisher ........................... | 588/246 |

FOREIGN PATENT DOCUMENTS

| | | |
|---|---|---|
| DE | 44 32 299 | 3/1996 |
| EP | 0 329 638 | 8/1989 |
| EP | 0 550 136 | 7/1993 |
| WO | WO 99/28250 | 6/1999 |

OTHER PUBLICATIONS

Database WPI—XP-00248824—SU 1 447 509 May 1989.

* cited by examiner

*Primary Examiner* — Noah Wiese
(74) *Attorney, Agent, or Firm* — Merchant & Gould P.C.

(57) ABSTRACT

The present invention relates to a process for recycling SPL from primary aluminum production, comprising the steps of grinding the separated fractions or cuts, separating materials by means of mechanical treatment, mixing salt slags with SPL, dissolving in water the product obtained in the previous step, carrying out a chemical reaction between water and the materials to be made inert, sedimenting, removing cyanides, filtering to obtain a soluble fraction and another insoluble fraction, washing the insoluble fraction, crystallizing salts of the soluble fraction and aging or conditioning the insoluble fraction. The present invention further relates to the product obtained by means of said process and the use thereof in different fields of the art.

6 Claims, No Drawings

PROCESS FOR RECYCLING SPENT POT LININGS (SPL) FROM PRIMARY ALUMINIUM PRODUCTION

This application is a National Stage Application of PCT/EP2009/000189, filed 15 Jan. 2009, which claims benefit of Serial No. 08380016.9, filed 25 Jan. 2008 in Europe and which application(s) are incorporated herein by reference. To the extent appropriate, a claim of priority is made to each of the above disclosed applications.

OBJECT OF THE INVENTION

The present invention describes a process for recycling used electrolytic cells or spent pot linings (SPL) from primary aluminium production. Said recycling is carried out in a plant for recycling the salt slags from the rotary furnaces of an aluminium refinery.

The invention is comprised in the technical field of metallurgy, and specifically in the field of exploiting and using metal materials.

BACKGROUND OF THE INVENTION

SPL is a well known waste resulting from the aging of used electrolytic cell cathodes in primary aluminium production. This cathode is formed from refractory material, conductive carbonaceous material and other various materials (iron bars, insulators, etc.). Over the operating time, these materials react with the content of the tanks and effectiveness in their operation is lost, and they must be disassembled.

A toxic and hazardous waste, SPL, is thus obtained which is normally poured in to special dumps, as such, or after some impurities have been removed. This waste has several characteristics, depending on the cut made when disassembling the lining from the used cathodes: refractory, carbon or mixed. CN$^-$, nitrides, carbides, fluorine, etc, are the most important impurities.

Due to the toxicity of this waste, the government must control the treatment and destination of this material in order to not affect the environment. The carbonaceous part has the most evident application for power production, but must also be prepared.

SPL is generally treated in dry or wet conditions to destroy the most harmful impurities, obtain an inert waste, or separate and reuse any of its present constituents.

To date, there are many different processes for inserting, recycling and reusing the material from these cathodes, however, most of them are focused on reducing or preventing the hazard involved in handling the powdery waste, and are focused on adding some type of substance with passivating properties reducing the hazard.

In this same sense, U.S. Pat. No. 5,352,419 describes a process for the recovery of aluminium and fluorides from SPL comprising the steps of calcining SPL to produce an ash with environmentally acceptable levels; the ashes are subsequently filtered in a solution containing a mineral acid, obtaining the corresponding aluminum salt in a sufficient amount to dissolve the aluminum and fluoride contents, in order to subsequently subject the filtered liquid to hydrolysis to cause precipitation of an aluminum fluoride product.

European patent EP0550136 describes a method for the treatment of SPL, including refractory materials, to transform SPL into a state in which it can be used as a filler material or as raw material. The SPL is crushed and supplied to an electrothermic smelting furnace, optionally together with a $SiO_2$ source, in which the SPL is melted at a temperature between 1300 and 1750° C. An oxidizing agent is supplied to the melt to oxidize carbon and other oxidizable components contained in the SPL such as metals, nitrates and carbides. A calcium oxide source is also supplied to the smelting furnace in the amount necessary to react with all the fluorides present in the form of $CaF_2$, the slag of which is liquid at the bath temperature inside the furnace. The calcium aluminate slags, or the calcium aluminate silicate slags and, optionally a metal phase, are used for blocks and granules.

U.S. Pat. No. 6,132,574 relates to a bottom lining for electrolytic cells, especially for electrolytic cells of aluminium from primary production and from secondary refining, the base body of the electrolytic cells being formed by steel pots, as well as a process for manufacturing it.

All the previous patents have attempted to recover certain substances contained in SPL and produce an inert waste which can be poured without problems. To that end, pilot and industrial plants have been built to carry out the operations for that purpose. However, the investments to be made are very large, the process for treating SPL was very complex, the waste obtained was not as inert as expected, and the products obtained did not have the desired quality. It is therefore necessary to develop new processes or routes for eliminating or treating SPL with lower associated costs and in which good results as regards inerting and clarity are obtained in order to affect the environment to the lowest extent possible.

DESCRIPTION OF THE INVENTION

The present invention concerns a process for recycling SPL from primary aluminium production, in which inert products with a higher quality are obtained compared to that described in the state of the art. Said process is implemented in existing plants for the treatment of salt slags from a rotary furnace used in aluminium refineries for recycling aluminium slags. Hazardous toxic waste (HTW) such as salt slags, combustion furnace filter dust and slag grinding dust for example, are treated in these plants. Each material, either salt slags, aluminium slag dust, filter dust or the object of the invention, SPL, are treated by means of an equivalent process, although the suitable specific parameters are adjusted for each of them.

Thus, by way of example, for salt slags, the main operations that are carried out are grinding, dissolution, reaction, sedimentation, filtering, washing, crystallization and maturing or drying. The waste is supplied to this circuit at the most suitable point, before or in the reactor. For the aluminium slag dust from grinding, there is dosing, dissolution and reaction in another reactor. The mixture then goes to the main circuit. For filter dust, a special conveyor, pyrolysis if necessary, and dosing are used, the material then going to the main circuit before the reaction.

For the SPL object of the present invention, the process comprises the following steps:

a) Grinding each of the separated fractions or cuts.
b) Mechanically treating in order to separate materials. Said separation treatment is carried out by sizes, by means of mesh type sieves and also by means of magnetic systems for separating iron particles.
c) Mixing salt slag with SPL in a 3:1 ratio. Mixing in this ratio is mainly due to the fact that a salt slag/SPL mixture at a different ratio has different reactivity, and requires different external actions for maintaining 90-95° C. in the reactor.
d) A solution is made with the product resulting from the previous step in water at a basic pH, preferably a pH within the range from 11 to 12.

e) A chemical reaction is carried out, the small amounts of aluminium, nitrides, carbides and sulfides are thus eliminated and the corresponding gases are also given off. The toxic materials are thus eliminated or made inert. The reaction is carried out between the hot water at a basic pH and the components to be made inert. Said reaction is carried out in closed reactors with an inert (oxygen-free) atmosphere, with stirring. In these reactions, the gases are aspirated to the gas treatment plant already existing in salt slag treatment plants.

f) Sedimenting and eliminating cyanides. This elimination is carried out by means of adding sodium hypochlorite according to the amount of cyanide in the solution.

g) Filtering and washing. To separate the soluble and insoluble fractions and wash the latter by means of traditional filterings described in the state of the art.

h) The salts of the soluble fraction are crystallized by means of water evaporation by any technique comprised in the state of the art, preferably by means of heating. Flux salts with small amounts of fluorine are thus obtained, which improves the type of salt usually obtained in these types of plants (salt slags). Therefore, a salt is thus obtained which is a better fluxing agent than the salts obtained by other processes.

i) The insoluble fraction is aged or conditioned by means of analyzing the components and dehydrating by decanting.

The main differences while treating SPL in relation to the treatment of salt slays are:

In the grinding, the SPL material is less hard and the dwell time of the material in the installation is much shorter. Internal recycling thereof in a closed circuit is not required.

In the subsequent separation of materials, SPL contains less Al and more C, therefore the equipment must be regulated in a different manner. The equipment works with a less strict regulation in Al and Fe separators.

The dissolution of SPL hardly presents any difficulty and requires less water than usual with salt slags.

As regards the reactivity, it must be taken into account that SPL is less reactive. It has been considered that the ideal working ratio is mixing slag/SPL in a 3:1 ratio. SPL does not have sufficient reactivity to start the reaction and it is therefore necessary to mix it with salt slags in that ratio.

In the gases obtained from the reaction, the same types of gases are produced with the presence of SPL with some differences: there is a greater $CH_4$ production.

In the liquor to be handled, with SPL there is more fluorine and there are cyanides.

The most important differences of the treatment of SPL in relation to the treatment of salt slags is in the reaction with water of both of them.

With 100% SPL, external heating is required and there are more than 100 ppm of cyanides in the liquor obtained; these cyanides must be eliminated with the addition of sodium hypochlorite according to the reactions:

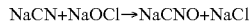

$$NaCN + NaOCl \rightarrow NaCNO + NaCl \qquad 1$$

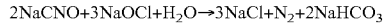

$$2NaCNO + 3NaOCl + H_2O \rightarrow 3NaCl + N_2 + 2NaHCO_3 \qquad 2$$

This is not necessary when operating only with salts slags o aluminium slags, having only 2 ppm of cyanides. Tests also show that a liquor with 800 ppm of F is obtained.

A salt slag/SPL mixture at a different ratio will have different reactivity and requires different external actions to maintain 90-95° C. in the reactor. Since SPL has 4 times more F, working with 25/75% of SPL/salt slag is proposed so as to have fluorine in the liquor in the order of 100 ppm in the liquor and so that the level of this element does not increase significantly in the final oxide obtained.

When the process is carried out, it produces an insoluble solid product, as well as salts the produced quality of which has additional fluorine, making them a better product as a fluxing agent with respect to those obtained by treating salt slags.

A second fundamental aspect of the present invention relates to the insoluble product obtained by means of the previously described process which is characterized in that it is an inert material in which the main component is aluminium oxide ($Al_2O_3$ in a proportion of 55-60), and in a non-limiting sense, other metal oxides ($SiO_2$ in a proportion of 8-15, $F_2Ca$ in a proportion of 2-8, $Fe_2O_3$ in a proportion of 0.8-2, cryolite in a proportion of 0-5 and MgO in a proportion of 3-5), carbon (in a proportion of 2-10), having applications as secondary raw material, substituting natural raw materials which can be used up or are non-renewable.

A third fundamental aspect of the present invention relates to the use of the previously defined product for construction, for its use in ceramic materials, artificial mineral fibers, etc.

PREFERRED EMBODIMENT OF THE INVENTION

In the Befesa Salt Slag plant in Witchurch (Wales) in which aluminium and salt slags are recycled, 25 tn. of SPL were recycled. The installation was fed a 3:1 salt slag/SPL ratio: 100 tn. of mixture in total were treated and the ground material was collected in a separate bin. The reaction also took place in a reactor dedicated to this material and the liquor obtained was kept separated. At the end, 100 tn. of a solid aluminium oxide product, without a considerable increase of F, were obtained.

The invention claimed is:

1. A process for recycling spent pot lining (SPL) from primary aluminium production cells, the SPL being obtained by the method comprising:

disassembling the linings from the used cell cathodes in cuts or fractions, said fractions comprising refractory materials, carbonaceous materials and other materials like insulators and iron bars;

grinding each of the separated fractions or cuts; and separating the materials of said fractions by mechanical treatment including sizing means, sieves and magnetic systems for separating iron particles, and wherein the process for recycling the SPL comprises:

i. mixing salts slags recycled from aluminium refining with separated SPL materials to form a reaction mixture in a reactor, or mixing SPL and salt slags prior to feeding the obtained mixture in a reactor, and maintaining the temperature of the reaction mixture in the reactor within the range from 90 to 95° C.;

ii. reacting the mixture of salt slags and SPL with water at a basic pH so as to obtain a solution liquor of dissolved salt slag/SPL material and an undissolved fraction;

iii. sedimenting said solution liquor;

iv. eliminating cyanides from the solution liquor by adding sodium hypochlorite;

v. filtering the solution liquor to obtain a soluble fraction and another insoluble fraction;

vi. washing the insoluble fraction separated in the filtering step;

vii. crystallizing salts of the soluble fraction in the solution liquor by means of water evaporation, and viii. aging or conditioning the insoluble fraction;

wherein the salt slags are mixed with SPL at a 3:1 ratio.

2. The process for recycling SPL from primary aluminium production according to claim 1, wherein nitrides, aluminium, carbides and sulfides are eliminated and gases are also given off.

3. The process for recycling SPL from primary aluminium production according to claim 1, wherein the crystallization is carried out by means of evaporation by heating.

4. The process for recycling SPL from primary aluminium production according to claim 1, wherein the aging is carried out by means of analyzing the components and dehydrating by decanting.

5. A process for recycling spent pot lining (SPL) from primary aluminium production cells, the SPL being obtained by the method comprising:
   disassembling the linings from the used cell cathodes in cuts or fractions, said fractions comprising refractory materials, carbonaceous materials and other materials like insulators and iron bars;
   grinding each of the separated fractions or cuts; and
   separating the materials of said fractions by mechanical treatment including sizing means, sieves and magnetic systems for separating iron particles,
   and wherein the process for recycling the SPL comprises:
   i. mixing salts slags recycled from aluminium refining with separated SPL materials to form a reaction mixture in a reactor, or mixing SPL and salt slags prior to feeding the obtained mixture in a reactor, and maintaining the temperature of the reaction mixture in the reactor within the range from 90 to 95° C.;
   ii. reacting the mixture of salt slags and SPL with water at a basic pH so as to obtain a solution liquor of dissolved salt slag/SPL material and an undissolved fraction;
   iii. sedimenting said solution liquor;
   iv. eliminating cyanides from the solution liquor by adding sodium hypochlorite;
   v. filtering the solution liquor to obtain a soluble fraction and another insoluble fraction:
   vi. washing the insoluble fraction separated in the filtering step;
   vii. crystallizing salts of the soluble fraction in the solution liquor by means of water evaporation, and
   viii. aging or conditioning the insoluble fraction;
   wherein the reaction is carried out in closed reactors with an inert atmosphere with stirring.

6. A process for recycling spent pot lining (SPL) from primary aluminium production cells, the SPL being obtained by the method comprising:
   disassembling the linings from the used cell cathodes in cuts or fractions, said fractions comprising refractory materials, carbonaceous materials and other materials like insulators and iron bars;
   grinding each of the separated fractions or cuts; and
   separating the materials of said fractions by mechanical treatment including sizing means, sieves and magnetic systems for separating iron particles,
   and wherein the process for recycling the SPL comprises:
   i. mixing salts slags recycled from aluminium refining with separated SPL materials to form a reaction mixture in a reactor, or mixing SPL and salt slags prior to feeding the obtained mixture in a reactor, and maintaining the temperature of the reaction mixture in the reactor within the range from 90 to 95° C.;
   ii. reacting the mixture of salt slags and SPL with water at a basic pH so as to obtain a solution liquor of dissolved salt slag/SPL material and an undissolved fraction;
   iii. sedimenting said solution liquor;
   iv. eliminating cyanides from the solution liquor by adding sodium hypochlorite;
   v. filtering the solution liquor to obtain a soluble fraction and another insoluble fraction;
   vi. washing the insoluble fraction separated in the filtering step;
   vii. crystallizing salts of the soluble fraction in the solution liquor by means of water evaporation, and
   viii. aging or conditioning the insoluble fraction;
   wherein the dissolution is carried out at a pH within the range from 11 to 12.

* * * * *